US012656972B2

(12) United States Patent
Aoki

(10) Patent No.: US 12,656,972 B2
(45) Date of Patent: Jun. 16, 2026

(54) IMAGE MANAGEMENT APPARATUS MANAGING AUTOMATIC IMAGE DELETION OF TRANSFERRED IMAGE BASED ON GRACE PERIOD, AND IMAGE MANAGEMENT METHOD AND RECORDING MEDIUM

(71) Applicant: CASIO COMPUTER CO., LTD., Tokyo (JP)

(72) Inventor: Nobuhiro Aoki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/751,685

(22) Filed: Jun. 24, 2024

(65) Prior Publication Data

US 2024/0427517 A1 Dec. 26, 2024

(30) Foreign Application Priority Data

Jun. 26, 2023 (JP) ................................. 2023-104056

(51) Int. Cl.
*G06F 3/06* (2006.01)

(52) U.S. Cl.
CPC .......... *G06F 3/0652* (2013.01); *G06F 3/0608* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,429,359 | B1* | 4/2013 | Desai ................... | G06F 11/1461 |
| | | | | 711/E12.103 |
| 8,538,919 | B1* | 9/2013 | Nielsen ............... | H04L 63/0272 |
| | | | | 718/1 |
| 8,593,678 | B2* | 11/2013 | Ohishi ................ | H04N 1/2166 |
| | | | | 358/1.15 |
| 9,075,705 | B2* | 7/2015 | Hikichi ................ | G06F 11/004 |
| 9,092,182 | B2* | 7/2015 | Ohishi ............... | H04N 1/00944 |
| 9,344,596 | B2* | 5/2016 | Ohishi ............... | H04N 1/00973 |
| 9,619,335 | B1* | 4/2017 | Bushman ................ | G06F 16/11 |
| 9,798,573 | B1* | 10/2017 | Koshy ................. | G06F 11/2038 |

(Continued)

FOREIGN PATENT DOCUMENTS

| | | | | |
|---|---|---|---|---|
| CN | 101263492 | B * | 2/2013 | .......... G06F 16/256 |
| JP | 2000184328 | A | 6/2000 | |

(Continued)

OTHER PUBLICATIONS

Microsoft. "Computer Dictionary", 5th Edition, 2002, p. 527 (Year: 2002).*

(Continued)

*Primary Examiner* — Christopher D Birkhimer

(74) *Attorney, Agent, or Firm* — Holtz, Holtz & Volek PC

(57) ABSTRACT

An information processing apparatus includes a processor configured to: set a grace period for image deletion in response to transferring one or more images from a first storage area to a second storage area different from the first storage area, according to a user's instruction; and give an instruction to delete, from the first storage area, an image corresponding to the transferred image, in response to a lapse of the grace period starting from the transfer.

10 Claims, 8 Drawing Sheets

(56) References Cited

U.S. PATENT DOCUMENTS

| | | | | |
|---|---|---|---|---|
| 9,800,291 | B1* | 10/2017 | Ben David | G06F 11/1415 |
| 10,602,017 | B2* | 3/2020 | Nakabayashi | G06F 16/125 |
| 10,762,041 | B2* | 9/2020 | Gangadharaiah | G06F 16/125 |
| 11,704,043 | B1* | 7/2023 | Throgmorton | G06F 11/1469 |
| | | | | 711/162 |
| 2002/0141580 | A1* | 10/2002 | Okuyama | H04N 5/76 |
| | | | | 380/201 |
| 2004/0117414 | A1* | 6/2004 | Braun | G06F 8/65 |
| 2005/0155079 | A1* | 7/2005 | Chen | H04N 21/4147 |
| | | | | 348/E7.071 |
| 2006/0005074 | A1* | 1/2006 | Yanai | G06F 3/0619 |
| | | | | 714/6.32 |
| 2006/0241979 | A1 | 10/2006 | Sato et al. | |
| 2007/0011416 | A1* | 1/2007 | Lee | G06F 3/0617 |
| | | | | 711/162 |
| 2007/0285714 | A1 | 12/2007 | Hirayama et al. | |
| 2008/0074689 | A1 | 3/2008 | Yamada et al. | |
| 2008/0140902 | A1* | 6/2008 | Townsend | H04B 1/0475 |
| | | | | 710/306 |
| 2008/0307020 | A1* | 12/2008 | Ko | G06F 21/6245 |
| 2009/0041230 | A1* | 2/2009 | Williams | G06F 11/1448 |
| | | | | 707/999.204 |
| 2011/0055559 | A1* | 3/2011 | Li | G06F 21/6218 |
| | | | | 380/259 |
| 2011/0236049 | A1* | 9/2011 | Haga | G03G 15/5004 |
| | | | | 399/75 |
| 2012/0200892 | A1 | 8/2012 | Hirayama et al. | |
| 2013/0022294 | A1 | 1/2013 | Hirayama et al. | |
| 2013/0024423 | A1* | 1/2013 | Doshi | G06F 11/1448 |
| | | | | 707/640 |
| 2013/0166521 | A1* | 6/2013 | Ghatty | G06F 11/1469 |
| | | | | 707/E17.005 |
| 2013/0173554 | A1* | 7/2013 | Ubukata | G06F 11/2094 |
| | | | | 707/640 |
| 2016/0085772 | A1* | 3/2016 | Vermeulen | G06F 16/21 |
| | | | | 707/615 |
| 2016/0086260 | A1* | 3/2016 | Vermeulen | G06Q 40/00 |
| | | | | 705/35 |
| 2016/0092535 | A1* | 3/2016 | Kuchibhotla | G06F 16/27 |
| | | | | 707/634 |
| 2016/0196216 | A1* | 7/2016 | Lee | G06F 3/0631 |
| | | | | 711/170 |
| 2017/0132082 | A1* | 5/2017 | Resch | G06F 11/1076 |
| 2017/0132086 | A1* | 5/2017 | Blackburn | G06F 11/1466 |
| 2017/0286234 | A1* | 10/2017 | Shulga | G06F 11/1469 |
| 2019/0327516 | A1* | 10/2019 | Panchaksharaiah | |
| | | | | H04N 21/4335 |
| 2021/0096957 | A1* | 4/2021 | Rahman | G06F 11/1471 |
| 2023/0025827 | A1* | 1/2023 | Shelton, IV | G06F 13/4068 |
| 2023/0112692 | A1* | 4/2023 | Richard | G06F 3/0604 |
| | | | | 711/154 |
| 2023/0195386 | A1* | 6/2023 | Moon | G06F 3/0604 |
| | | | | 711/154 |

FOREIGN PATENT DOCUMENTS

| | | | |
|---|---|---|---|
| JP | 2003046705 A | 2/2003 | |
| JP | 2004363797 A | 12/2004 | |
| JP | 2008004074 A | 1/2008 | |
| JP | 2008085402 A | 4/2008 | |
| JP | 2013008379 A | 1/2013 | |
| WO | WO-2019064009 A1 * | 4/2019 | H04L 67/1097 |

OTHER PUBLICATIONS

Extended European Search Report (EESR) dated Oct. 17, 2024, issued in counterpart European Application No. 24183405.0.

* cited by examiner

FIG. 4

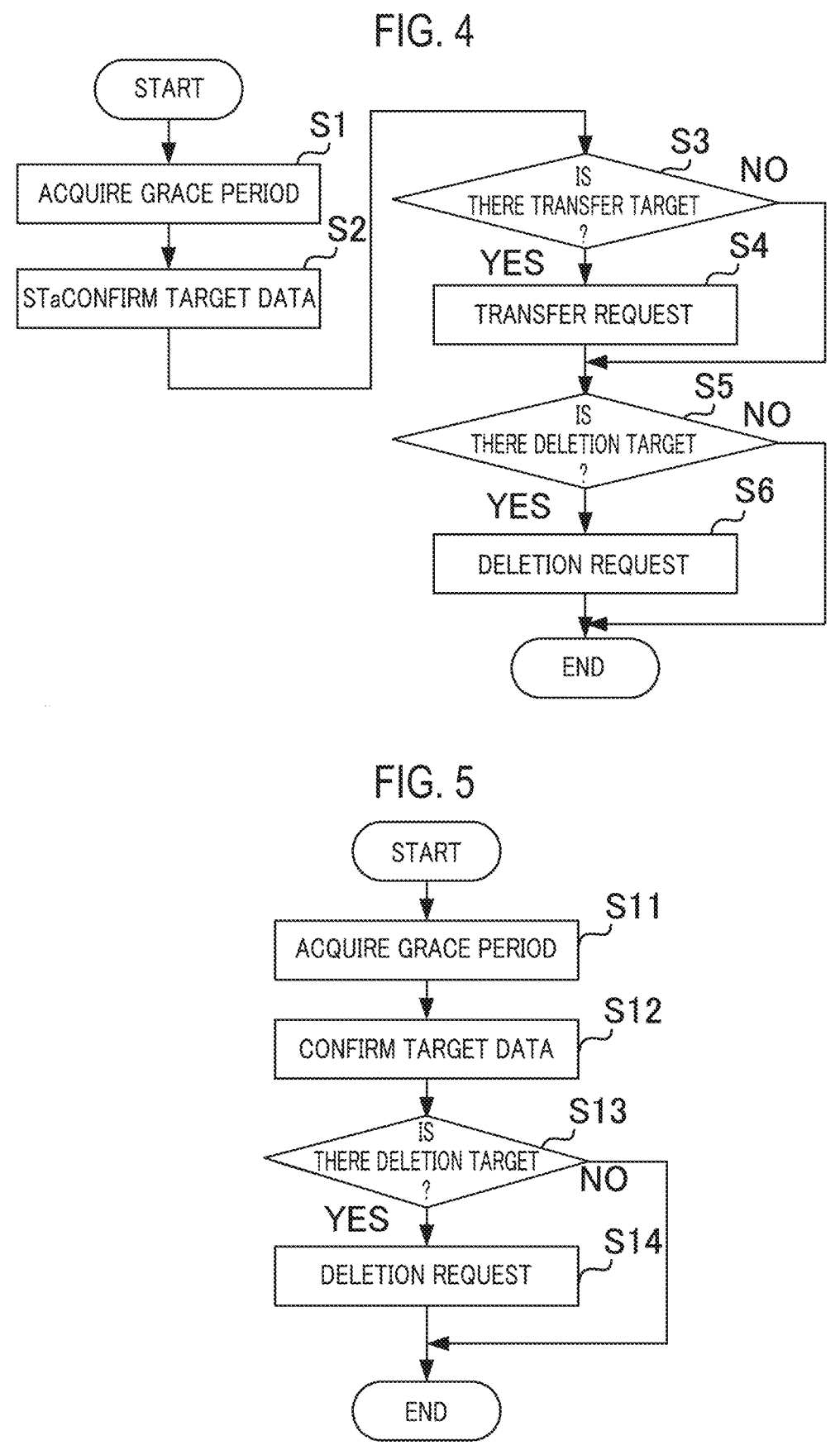

START

ACQUIRE GRACE PERIOD — S1

STaCONFIRM TARGET DATA — S2

IS THERE TRANSFER TARGET ? — S3

NO

YES

TRANSFER REQUEST — S4

IS THERE DELETION TARGET ? — S5

NO

YES

DELETION REQUEST — S6

END

FIG. 5

START

ACQUIRE GRACE PERIOD — S11

CONFIRM TARGET DATA — S12

IS THERE DELETION TARGET ? — S13

NO

YES

DELETION REQUEST — S14

END

Figures 10A, 10B:
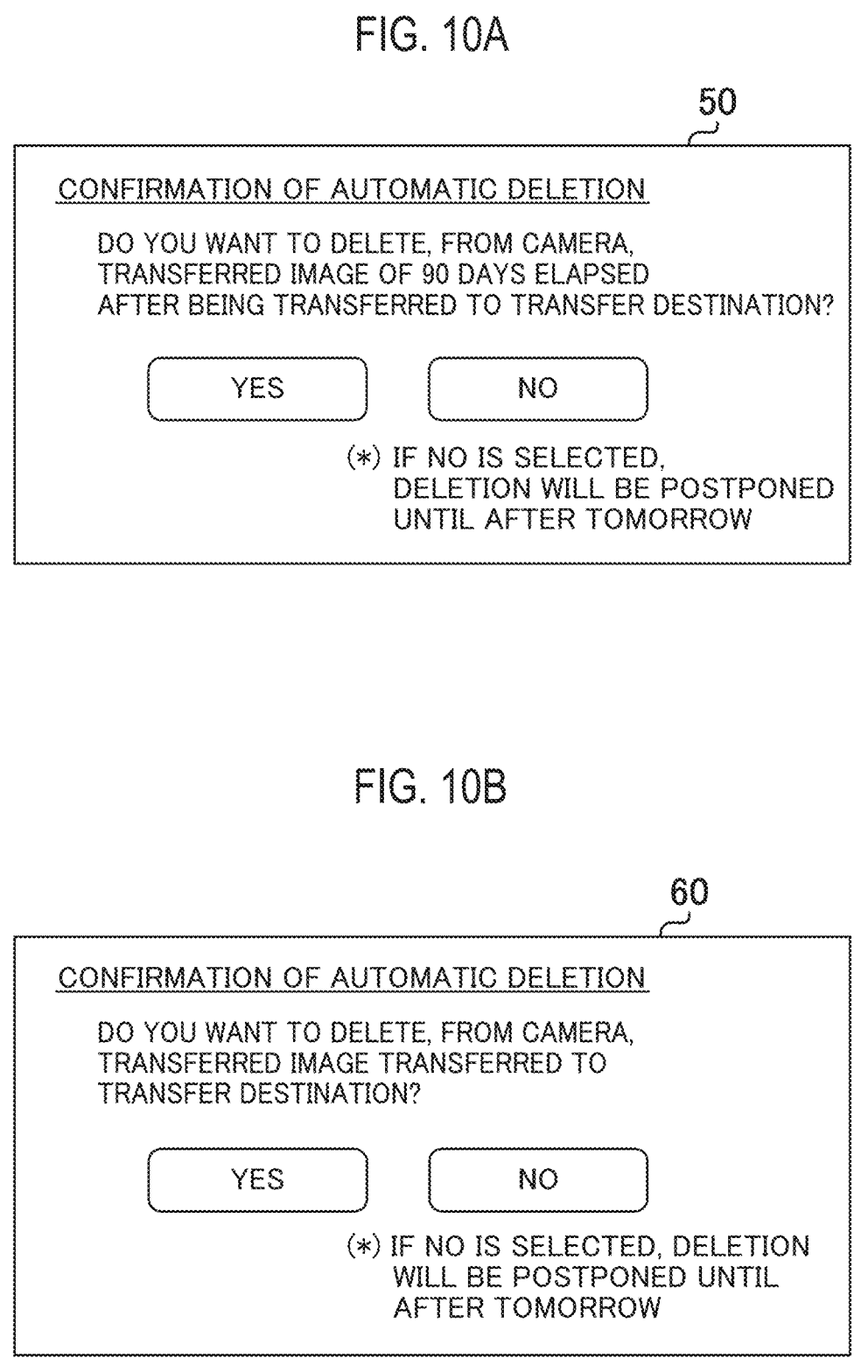

CONFIRMATION OF AUTOMATIC DELETION

DO YOU WANT TO DELETE, FROM CAMERA,
TRANSFERRED IMAGE OF 90 DAYS ELAPSED
AFTER BEING TRANSFERRED TO TRANSFER DESTINATION?

[ YES ]          [ NO ]

(*) IF NO IS SELECTED,
     DELETION WILL BE POSTPONED
     UNTIL AFTER TOMORROW

CONFIRMATION OF AUTOMATIC DELETION

DO YOU WANT TO DELETE, FROM CAMERA,
TRANSFERRED IMAGE TRANSFERRED TO
TRANSFER DESTINATION?

[ YES ]          [ NO ]

(*) IF NO IS SELECTED, DELETION
     WILL BE POSTPONED UNTIL
     AFTER TOMORROW

IMAGE MANAGEMENT APPARATUS MANAGING AUTOMATIC IMAGE DELETION OF TRANSFERRED IMAGE BASED ON GRACE PERIOD, AND IMAGE MANAGEMENT METHOD AND RECORDING MEDIUM

CROSS-REFERENCE TO RELATED APPLICATIONS

This application claims priority to and the benefit of Japanese Patent Application No. 2023-104056 filed on Jun. 26, 2023. The entire specification, claims, and drawings of Japanese Patent Application No. 2023-104056 are incorporated herein by reference.

TECHNICAL FIELD

The present specification relates to an image management apparatus, an image management method, and a recording medium.

BACKGROUND ART

Conventionally, in order to efficiently manage a large amount of images, a technique of automatically deleting an image from a storage device has been proposed (for example, JP 2013-008379 A).

BRIEF DESCRIPTION OF THE DRAWINGS

FIG. 4 is a flowchart illustrating an example of processing executed by the information processing apparatus according to the first embodiment;

FIG. 5 is a flowchart illustrating another example of processing executed by the information processing apparatus according to the first embodiment;

FIG. 9 is a flowchart illustrating an example of processing executed by the information processing apparatus according to the second embodiment;

FIG. 10A is a view illustrating a display example of a confirmation dialog according to the second embodiment;

FIG. 10B is a view illustrating another display example of the confirmation dialog according to the second embodiment;

DESCRIPTION OF EMBODIMENTS

First Embodiment

Figures 1, 2:
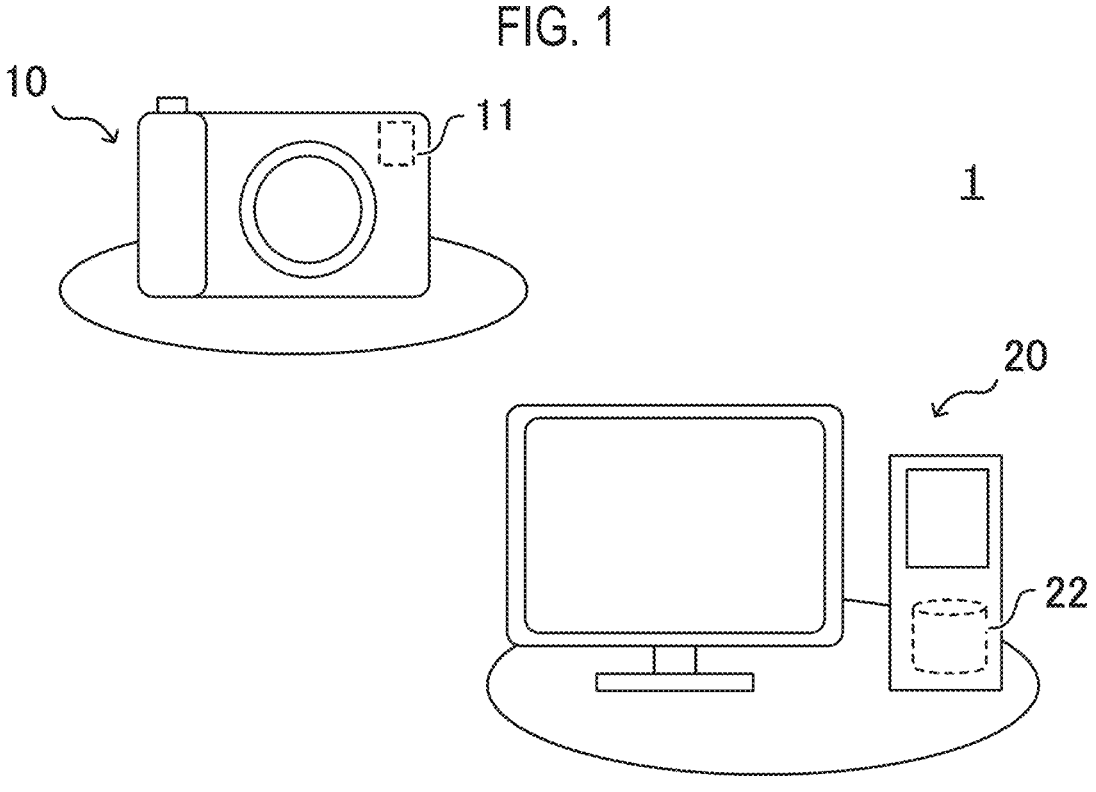
FIG. 1 is a diagram illustrating a configuration of a system according to a first embodiment.
FIG. 2 is a block diagram illustrating an example of a hardware configuration of the information processing apparatus according to the first embodiment.

FIG. 1 is a diagram illustrating a configuration of a system according to the present embodiment. FIG. 2 is a block diagram illustrating an example of a hardware configuration of the information processing apparatus according to the present embodiment. A system 1 illustrated in FIG. 1 is an image management system including a camera 10 and an information processing apparatus 20, and manages image data acquired by imaging by the camera 10. In the system 1, the camera 10 and the information processing apparatus 20 are communicably connected to each other.

The camera 10 is an imaging device that acquires image data by imaging. The camera 10 includes an image sensor (not illustrated) and a recording medium 11 that records image data. The image data acquired by the camera 10 is recorded in the recording medium 11.

The camera 10 has a communication function, and exchanges image data and the like with the information processing apparatus 20. Note that, although FIG. 1 illustrates an example in which the camera 10 and the information processing apparatus 20 are wirelessly connected, the camera 10 and the information processing apparatus 20 may be connected by a communication cable.

The information processing apparatus 20 is an image management apparatus that manages image data acquired by the camera 10, and is communicably connected to the camera 10 having the recording medium 11. The information processing apparatus 20 is a computer that executes an image management program, and includes, for example, a processor 21, a storage device 22, an input device 23, a display device 24, and a communication device 25 as illustrated in FIG. 2.

The storage device 22 stores, for example, an image management application program (program 22a) installed in advance. In the information processing apparatus 20, the processor 21 executes the program 22a stored in the storage device 22 to perform image management processing including transfer of image data from the recording medium 11 of the camera 10 to the information processing apparatus 20 and automatic deletion of the transferred image data from the recording medium 11. Image data 22b transferred to the information processing apparatus 20 is stored in the storage device 22.

In the system 1 configured as described above, the information processing apparatus 20 performs the image management processing including the transfer and the automatic deletion of the image data, so that it is possible to suppress occurrence of various inconveniences caused by accumulation of a large amount of image data in the recording medium 11. In particular, when image data satisfying a predetermined condition is automatically deleted by automatic deletion, it is possible to avoid, for example, a situation in which a free capacity of the recording medium 11 is tight due to a large amount of image data and new image data cannot be acquired (that is, there is a possibility that the operation of the device of the transfer source is affected by a large amount of image data remaining in the transfer source), or a situation in which a scan time of the recording medium 11 performed to extract image data to be transferred or deleted becomes longer than an allowable range (that is, there is a possibility that the speed of transfer is affected by a large amount of image data remaining in the transfer source).

Figures 3A, 3B:
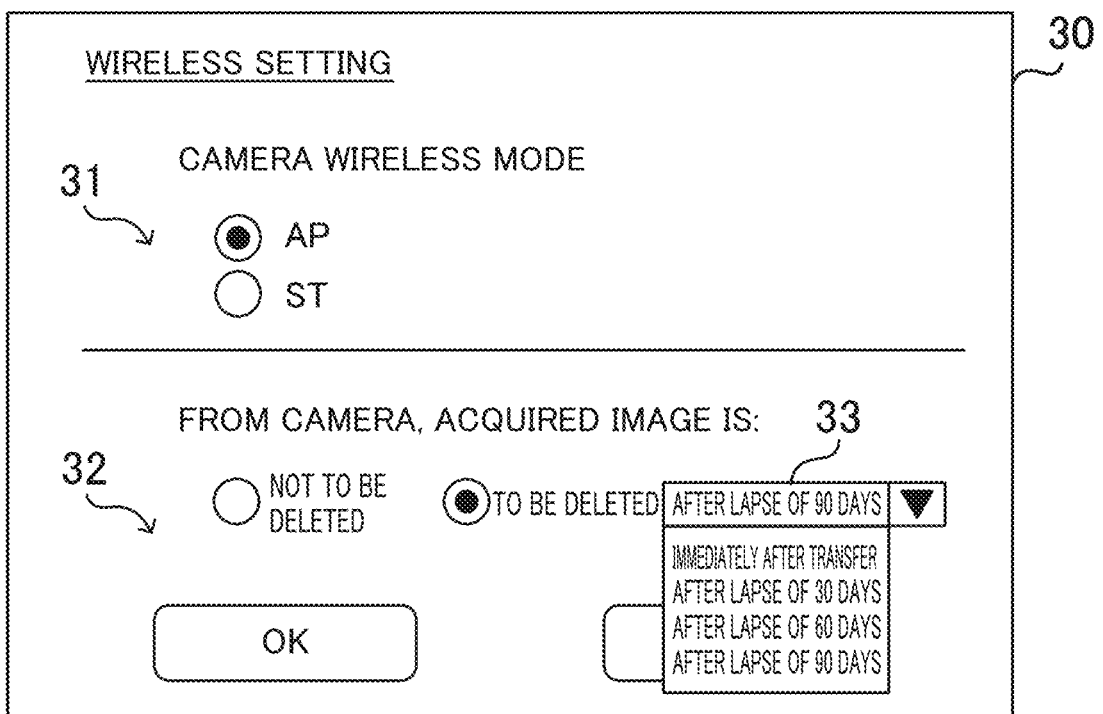
FIG. 3A is a view illustrating a display example at the time of default setting of a wireless setting screen according to the first embodiment.
FIG. 3B is a view illustrating another display example of the wireless setting screen according to the first embodiment.

The automatic deletion setting included in the image management processing performed by the information processing apparatus 20 will be described below. FIG. 3A and FIG. 3B are views illustrating display examples of the wireless setting screen according to the present embodiment. The user of the information processing apparatus 20 can set an automatic deletion function of automatically deleting transferred image data from the recording medium 11 on the wireless setting screen 30 displayed on the display device 24 by the processor 21 executing the program 22*a*.

The wireless setting screen 30 is a screen for performing wireless communication setting between the camera 10 and the information processing apparatus 20, and includes a mode selection area 31 and an automatic deletion setting area 32. In a default state (that is, initial setting), as illustrated in FIG. 3A, a camera wireless mode is set to an access point (AP) mode in the mode selection area 31.

The AP mode is a mode in which the camera 10 itself operates as an access point (that is, a master unit) to perform communication between the camera 10 and the information processing apparatus 20. The station (ST) mode is a mode in which the camera 10 operates as a slave device, and is a mode in which the camera 10 and the information processing apparatus 20 communicate via different access point.

In the default state (that is, the initial setting), as illustrated in FIG. 3A, "not to be deleted", which is not to perform an automatic deletion, is selected in the automatic deletion setting area 32. The automatic deletion setting area 32 includes a grace period setting area 33 in which the user can designate a grace period from image transfer to image deletion. The grace period setting area 33 is, for example, a list box for selecting the length of the grace period from among predetermined options, but in the default state, as illustrated in FIG. 3A, this list box is invalidated.

Note that it is sufficient that the list box cannot be operated by the user in the default state, more strictly, in a state where "not to be deleted" can be selected in the automatic deletion setting area 32, and the list box may be hidden instead of invalidating the list box.

In a case where the user desires to automatically delete the transferred image data from the recording medium 11, the user may select "to be deleted" in the automatic deletion setting area 32. As a result, the transferred image data is automatically deleted from the recording medium 11 in the image management processing performed by the processor 21. As described above, in the information processing apparatus 20, the user can easily switch between validating and invalidating of the automatic deletion function on the wireless setting screen 30.

Furthermore, when "to be deleted" is selected, as illustrated in FIG. 3B, the grace period setting area 33 (list box) is validated, and the length of the grace period from image transfer to image deletion can be selected. When the user selects the length of the grace period from the options in the grace period setting area 33 and presses the OK button, the processor 21 sets the grace period according to the user's selection. As described above, in the information processing apparatus 20, the user can also set the grace period when the automatic deletion function is validated.

Note that, in FIG. 3B, four options of "Immediately after transfer", "After lapse of 30 days (from transfer)", "After lapse of 60 days (from transfer)", and "After lapse of 90 days (from transfer)" are illustrated, but the options selectable in the list box are not limited to this example. The options may include at least immediately after image transfer (in FIG. 3B, "Immediately after transfer") and a certain period after image transfer (in FIG. 3B, "After lapse of 30 days", "After lapse of 60 days", and "After lapse of 90 days").

As described above, in the information processing apparatus 20, the processor 21 operates as a processing unit that executes a setting process of setting a grace period and a deletion process of deleting, from the recording medium 11, the transferred image data in which a duplicate image data has been transferred from the recording medium 11, which is an example of a first storage area, to the storage device 22, which is an example of a second storage area different from the recording medium 11, after a lapse of the grace period starting from the image transfer. Note that, more strictly, the starting period of the grace period is desirably set at the end of transfer of the image data.

Since the grace period until the automatic deletion can be set on the basis of the transfer timing, the information processing apparatus 20 can secure a time for the user to confirm whether the transfer has been normally ended even in a case where the automatic deletion function is validated. Therefore, it is possible to alleviate the concern of the user about the unexpected loss of the image data due to the transfer failure, and an effect of prompting the user to use the automatic deletion function can be expected.

Furthermore, in the information processing apparatus 20, as illustrated in FIG. 3B, the processor 21 which is a processing unit sets a grace period on the basis of an operation of the user from among options including immediately after image transfer and a certain period after image transfer.

That is, the user can freely select the length of the grace period. Therefore, the user can appropriately select the optimal grace period according to different environments for each system, such as the capacity of the recording medium 11, the period during which the transferred image data is required as a backup, and the occurrence frequency of the image data. In general, the longer the grace period is set, the more image data is accumulated in the recording medium 11, and thus, it takes time to perform image management processing (image transfer and deletion) per one time. However, according to the information processing apparatus 20, it is possible to well balance the risk of image data loss and the processing time required for the image management processing.

FIG. 4 is a flowchart illustrating an example of processing executed by the information processing apparatus according to the present embodiment. FIG. 5 is a flowchart illustrating another example of processing executed by the information processing apparatus according to the present embodiment. Hereinafter, a specific example of the image management processing performed by the information processing apparatus 20 in a state where the automatic deletion function is validated will be described with reference to FIGS. 4 and 5.

First, an example in which automatic deletion is performed in synchronization with transfer of image data will be described with reference to FIG. 4. In a case where the automatic transfer function of the image data from the camera 10 to the information processing apparatus 20 is validated, the processing illustrated in FIG. 4 is performed, for example, when the program 22*a* is activated.

When the processing illustrated in FIG. 4 is started, the processor 21 first acquires a grace period from transfer of image data to automatic deletion (step S1). The grace period acquired in step S1 is a period set in advance on the wireless setting screen 30.

Thereafter, the processor 21 performs a transfer process (steps S2 to S4) of transferring, from the recording medium 11, the image data untransferred from the recording medium 11 to the storage device 22 which is an area different from the recording medium 11, and a deletion process (steps S2 and S5 to S6) of deleting the transferred image data after a lapse of the grace period from the recording medium 11.

Specifically, the processor 21 first confirms target data from the recording medium 11 (step S2). Here, image data to be transferred and image data to be deleted are confirmed. The image data to be transferred is untransferred image data that has not yet been transferred to the storage device 22 of the information processing apparatus 20 among the image data recorded in the recording medium 11. In addition, the image data to be deleted is image data that has been transferred to the storage device 22 among the image data recorded in the recording medium 11, and is image data for which a grace period acquired in step S1 has elapsed since a duplicate of the image data was transferred from the recording medium 11 to the storage device 22.

In step S2, the information processing apparatus 20 transmits an instruction to extract the target data to the camera 10. In accordance with the extraction instruction from the information processing apparatus 20, the camera 10 scans the recording medium 11 to extract the target data, and transmits the result to the information processing apparatus 20. The information processing apparatus 20 confirms the target data on the basis of the information received from the camera 10.

Next, the processor 21 determines the presence or absence of target data to be transferred (step S3), and in a case where there is image data to be transferred (step S3: YES), requests the information processing apparatus 20 to transfer the image data to be transferred (step S4). As a result, the camera 10 that has received the transfer request duplicates the image data to be transferred and transmits the duplicate to the information processing apparatus 20, and the information processing apparatus 20 stores the duplicate of the image data to be transferred in the storage device 22.

Further, the processor 21 determines the presence or absence of target data to be deleted (step S5), and in a case where there is image data to be deleted (step S5: YES), requests the information processing apparatus 20 to delete the image data to be deleted (step S6). That is, the processor 21 performs processing of transmitting a deletion request for requesting deletion of the transferred image data from the recording medium 11 to the camera 10 which is an imaging device. As a result, the camera 10 that has received the deletion request deletes the image data to be deleted from the recording medium 11.

Note that, in a case where the information processing apparatus 20 periodically monitors the presence or absence of image data to be transferred, the processing of FIG. 4 may be performed, not only at the time of startup, but also may be periodically performed while the program 22a is operating. In addition, the processing illustrated in FIG. 4 is not limited to the case where the automatic transfer function of the image data is validated, and may be performed in a case where the user manually gives an instruction to transfer of the image data.

As illustrated in FIG. 4, in addition to the setting processing and the deletion processing, the processor 21 as a processing unit executes a transfer processing of transferring an untransferred image from the recording medium 11. In particular, by performing the transfer processing in synchronization with the deletion processing, the image data to be transferred and the image data to be deleted can be simultaneously extracted by performing one scan on the recording medium 11. Therefore, the time required for the entire processing can be shortened as compared with the case where the transfer processing and the deletion processing are separately performed asynchronously.

Next, an example in which automatic deletion is performed asynchronously with transfer of image data will be described with reference to FIG. 5. The processing illustrated in FIG. 5 is periodically performed, for example, while the program 22a is operating.

When the processing illustrated in FIG. 5 is started, the processor 21 first acquires a grace period from transfer of image data to automatic deletion (step S11). The processing in step S11 is similar to the processing in step S1 in FIG. 4.

Next, the processor 21 confirms the target data from the recording medium 11 (step S12). The processing in step S12 is similar to the processing in step S2 in FIG. 4 except that only image data to be deleted is confirmed.

Thereafter, the processor 21 determines the presence or absence of target data to be deleted (step S13), and in a case where there is image data to be deleted (step S13: YES), requests the information processing apparatus 20 to delete the image data to be deleted (step S14). As a result, the camera 10 that has received the deletion request deletes the image data to be deleted from the recording medium 11.

Note that although the example in which the processing illustrated in FIG. 5 is periodically performed has been described above, the processing illustrated in FIG. 5 may be performed in a case where the user manually gives an instruction to delete the image data for which the grace period has elapsed.

As illustrated in FIG. 5, the processor 21 as a processing unit may perform the deletion processing asynchronously with the transfer processing. As a result, only necessary processing can be performed at a necessary frequency. The execution of the deletion processing and the transfer processing asynchronously is particularly effective in a case where frequencies at which the deletion processing and the transfer processing are required are greatly different.

Figure 6:
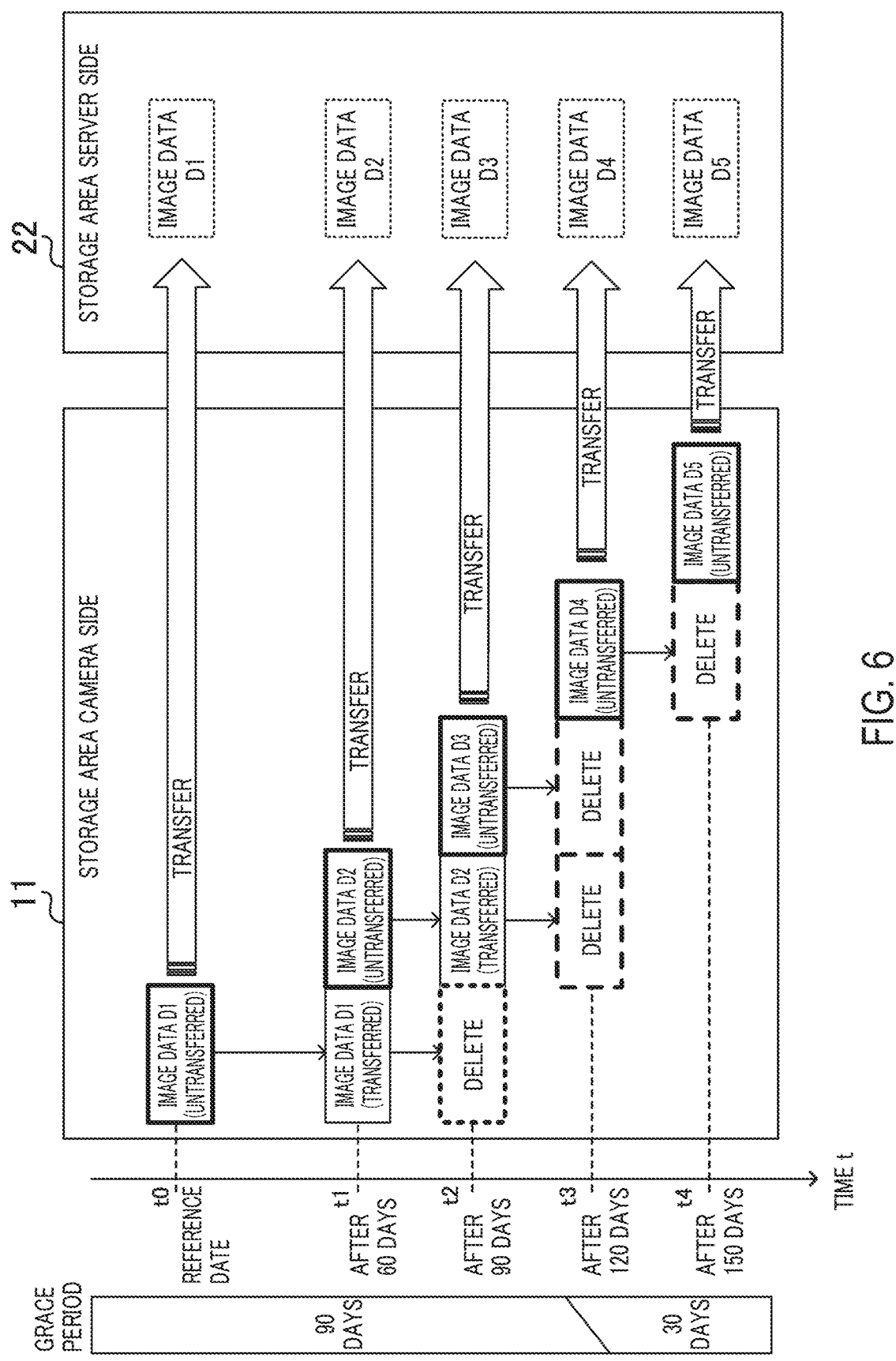
FIG. 6 is a diagram illustrating an example of transfer and deletion of image data from a recording medium caused by the processing illustrated in FIG. 4.
Figure 7:
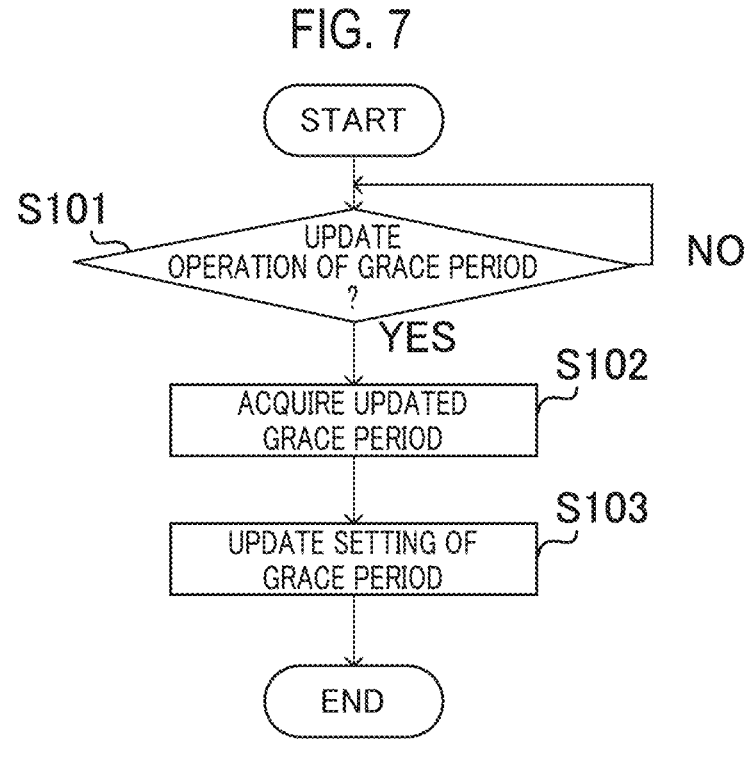
FIG. 7 is a flowchart of processing of updating a setting of a grace period.

FIG. 6 is a diagram illustrating an example of transfer and deletion of image data from the recording medium 11 caused by the processing illustrated in FIG. 4, and indicates an example of a case where the processing of FIG. 4 is performed on a reference date (0 day), 60 days, 90 days, 120 days, and 150 days after the reference date. FIG. 7 is a flowchart of processing of updating a setting of a grace period. When the user performs an update operation of the grace period, the processor 21 detects the operation (step S101: YES), acquires information of the updated grace period designated by the user (step S102), and updates the setting of the grace period by performing processing such as rewriting a configuration file (step S103). Note that, in this example, a case where the grace period initially set to 90 days is changed to 30 days after the transfer in the middle of the grace period will be described.

When the processing illustrated in FIG. 4 is performed on the reference date (t0) on which the untransferred image data D1 is recorded in the recording medium 11, the untransferred image data D1 is duplicated and the duplicate is transferred from the recording medium 11 to the storage device 22. Note that the image data D1 of the duplication source is not deleted from the recording medium 11 on the reference date (t0) since 90 days have not elapsed from the transfer.

When the processing illustrated in FIG. 4 is performed on a date of 60 days after the reference date (t1), untransferred image data D2 recorded on the recording medium 11 on and after the reference date is duplicated, and the duplicate is transferred from the recording medium 11 to the storage device 22. Note that the image data D1 and the image data D2 of the duplication source are not deleted from the recording medium 11 since the grace period of 90 days has not elapsed from the transfer of each image data on the date of 60 days after the reference date (t1).

When the processing illustrated in FIG. 4 is performed on a date of 90 days after the reference date (t2), untransferred image data D3 recorded on the recording medium 11 on and after the date of 60 days after the reference date is duplicated, and the duplicate is transferred from the recording medium 11 to the storage device 22. In addition, the image data D1 of the duplication source is deleted from the recording medium 11 in the processing illustrated in FIG. 4 since the grace period of 90 days has elapsed from the transfer on the date of 90 days after the reference date (t2). On the other hand, the remaining image data D2 and the image data D3 of the duplication source are not deleted from the recording medium 11 since the grace period of 90 days has not elapsed from the transfer of each image data on the date of 90 days after the reference date (t2).

When the processing illustrated in FIG. 4 is performed on a date of 120 days after the reference date (t3), untransferred image data D4 recorded on the recording medium 11 on and after the date of 90 days after the reference date is duplicated, and the duplicate is transferred from the recording medium 11 to the storage device 22. Further, the image data D2 and the image data D3 of the duplication source are deleted from the recording medium 11 in the processing illustrated in FIG. 4 since the updated grace period of 30 days has elapsed from the transfer of each image data on the date of 120 days after the reference date (t3). On the other hand, the remaining image data D4 of the duplication source is not deleted from the recording medium 11 on the date of 120 days after the reference date (t3) since the grace period of 30 days has not elapsed from the transfer.

When the processing illustrated in FIG. 4 is performed on a date of 150 days after the reference date (t4), untransferred image data D5 recorded on the recording medium 11 on and after the date of 120 days after the reference date is duplicated, and the duplicate is transferred from the recording medium 11 to the storage device 22. In addition, the image data D4 of the duplication source is deleted from the recording medium 11 in the processing illustrated in FIG. 4 since the updated grace period of 30 days has elapsed from the transfer on the date of 150 days after the reference date (t4). On the other hand, the remaining image data D5 of the duplication source is not deleted from the recording medium 11 on the date of 150 days after the reference date (t4) since the grace period of 30 days has not elapsed from the transfer.

As illustrated in FIG. 6, the grace period can be updated as appropriate. In the information processing apparatus 20, when the setting of the grace period is updated, the updated grace period is applied not only to the transferred image data duplicated after the update and to which the duplicate is transferred, but also to the transferred image data duplicated before the update and to which the duplicate is transferred. That is, the updated grace period is uniformly applied to the transferred image data regardless of the transfer time. Therefore, when the grace period is updated by the setting processing, the processor 21, which is the processing unit, deletes the transferred image data that has not been deleted from the recording medium 11 at the time of update from the recording medium 11 after the lapse of the updated grace period starting from the transfer of the transferred image data.

In this manner, by applying the updated grace period to all of the transferred image data, the image management processing reflecting the intention of the user can be executed at an early stage. As a result, for example, when the user detects that the free capacity of the recording medium 11 is tight and sets the grace period to be short, the free capacity can be secured relatively early. In addition, by detecting that the time required for the image management processing per one time by the user becomes longer and setting the grace period to be short, the image processing time can be shortened relatively early.

Note that although FIG. 6 illustrates an example in which the grace period is shortened, the grace period may be lengthened in the middle. For example, when sufficient free capacity can be secured, the grace period may be extended, and the transferred image data recorded on the recording medium 11 may be used as a backup for a long period of time.

Second Embodiment

The system and the image management apparatus according to the present embodiment are different from the system 1 and the image management apparatus (the information processing apparatus 20) according to the first embodiment in that a confirmation dialog is displayed on the display device 24 when the image data is automatically deleted from the recording medium 11 and the user is requested for final confirmation. Since components of the system and the image management apparatus are similar to those of the first embodiment, the same components are referred to by the same reference numerals.

Figure 8:
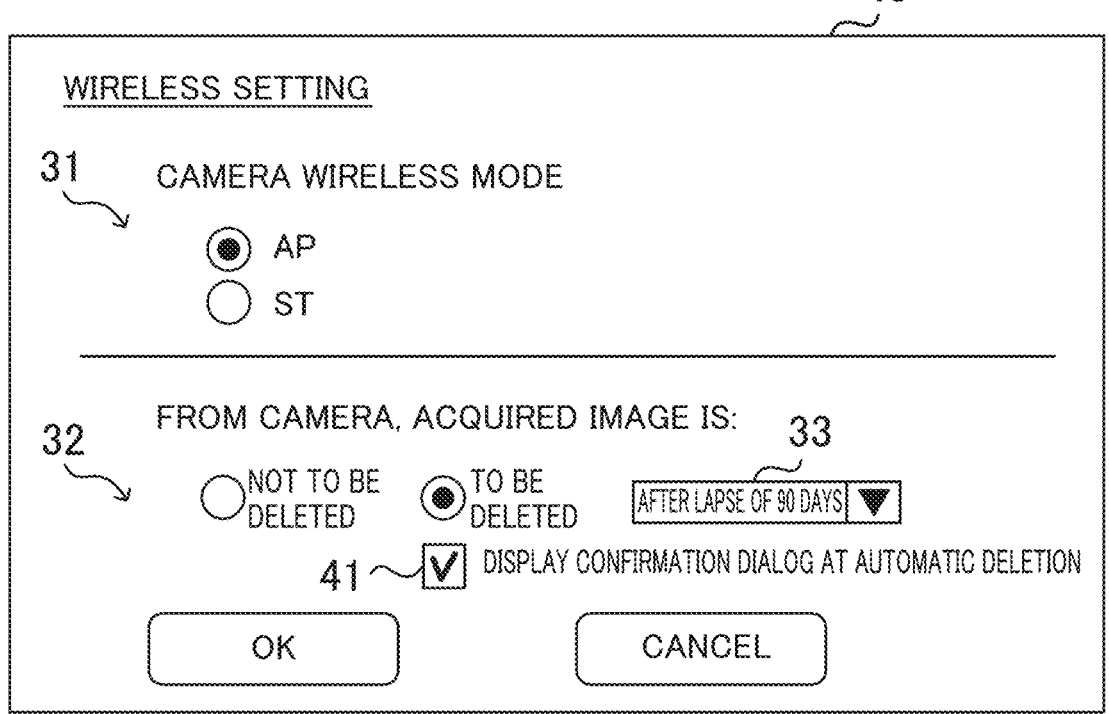
FIG. 8 is a view illustrating a display example of the wireless setting screen according to a second embodiment.

FIG. 8 is a view illustrating a display example of the wireless setting screen according to the present embodiment. In the image management apparatus according to the present embodiment, the user can set the automatic deletion function on the wireless setting screen 40 illustrated in FIG. 8 instead of the wireless setting screen 30 illustrated in FIGS. 3A and 3B.

The wireless setting screen 40 is different from the wireless setting screen 30 in that a confirmation display setting area 41 is included in the automatic deletion setting area 32. Note that the confirmation display setting area 41 is a check box for selecting whether or not to display a confirmation dialog when automatically deleting image data from the recording medium 11. In a case where the user desires to perform final confirmation before deleting the transferred image data, the user may check the confirmation display setting area 41.

Note that the confirmation display setting area 41 is invalidated or hidden so as not to be operated by the user in a state where "not to be deleted" is selected in the automatic deletion setting area 32, similarly to the grace period setting area 33.

Figure 9:
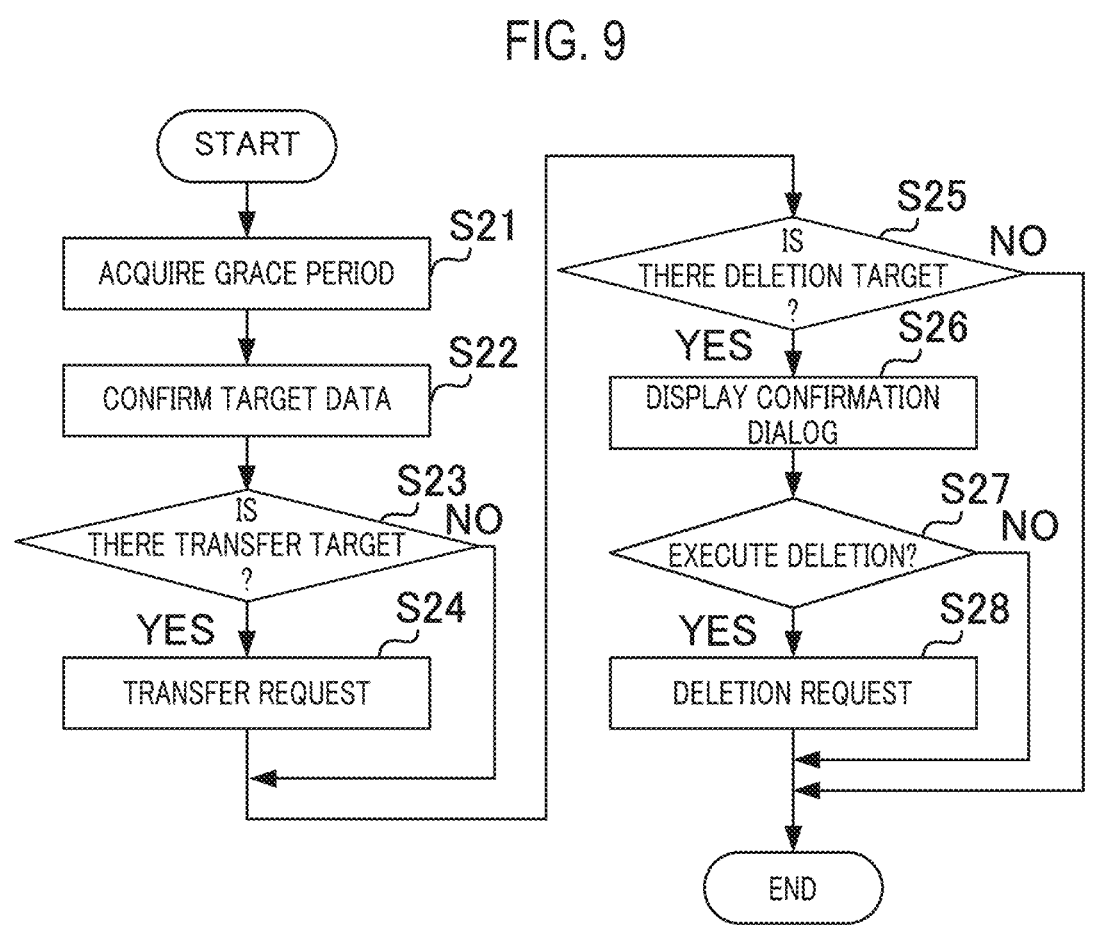

FIG. 9 is a flowchart illustrating an example of processing executed by the information processing apparatus according to the present embodiment; FIGS. 10A and 10B are views each illustrating a display example of a confirmation dialog according to the present embodiment. Hereinafter, a specific example of the image management processing performed by the image management apparatus in a state where the automatic deletion function is validated and the confirmation dialog display is validated will be described with reference to FIGS. 9 to 10B.

When the processing illustrated in FIG. 9 is started, the processor 21 first acquires a grace period from transfer of image data to automatic deletion (step S21). and confirms target data from the recording medium 11 (step S22). The processing in step S21 and step S22 is similar to the processing in step S1 and step S2 in FIG. 4.

Thereafter, the processor 21 determines the presence or absence of target data to be transferred (step S23), and in a case where there is image data to be transferred (step S23: YES), requests the image management apparatus to transfer the image data to be transferred (step S24). The processing in step S23 and step S24 is similar to the processing in step S3 and step S4 in FIG. 4.

Further, the processor 21 determines the presence or absence of target data to be deleted (step S25), and in a case where there is image data to be deleted (step S25: YES), displays a confirmation dialog on the display device 24 (step S26).

Note that, in step S26, the contents in the confirmation dialog may be changed according to the grace period acquired in step S21. For example, in a case where the grace period is 90 days, the confirmation dialog 50 illustrated in FIG. 10A may be displayed, and in a case where there is no grace period, that is, in a case of setting to delete image data immediately after image transfer, the confirmation dialog 60 illustrated in FIG. 10B may be displayed.

When detecting an operation on the confirmation dialog (confirmation dialog 50, confirmation dialog 60) and confirming the intention of the user to execute deletion (step S27: YES), the processor 21 requests the image management apparatus to delete the image data to be deleted (step S28). As a result, the camera 10 that has received the deletion request deletes the image data to be deleted from the recording medium 11.

When detecting an operation on the confirmation dialog (confirmation dialog 50, confirmation dialog 60) and confirming the intention of the user not to execute deletion (step S27: NO), the processor 21 ends processing illustrated in FIG. 9 without performing the deletion processing in step S28. As a result, the deletion processing is postponed until the next execution of the processing illustrated in FIG. 9.

As described above, in the present embodiment, before deleting the transferred image data of the duplication source from the recording medium 11, the processor 21 displays a confirmation dialog on the display device 24 to request the user for the final confirmation as to whether or not to delete the image data. Therefore, according to the image management apparatus according to the present embodiment, the user can postpone the deletion processing in a case where there is image data that the user wants to postpone the deletion even in the transferred image data after the grace period has elapsed, and can manually take necessary measures after the postpone.

Therefore, when setting the grace period, the user can individually cope with a situation in which the image data should be maintained beyond the grace period, which occurs irregularly, by postponing the deletion processing on the confirmation dialog while setting an appropriate grace period based on a normally assumed condition.

Third Embodiment

Figures 11, 12:
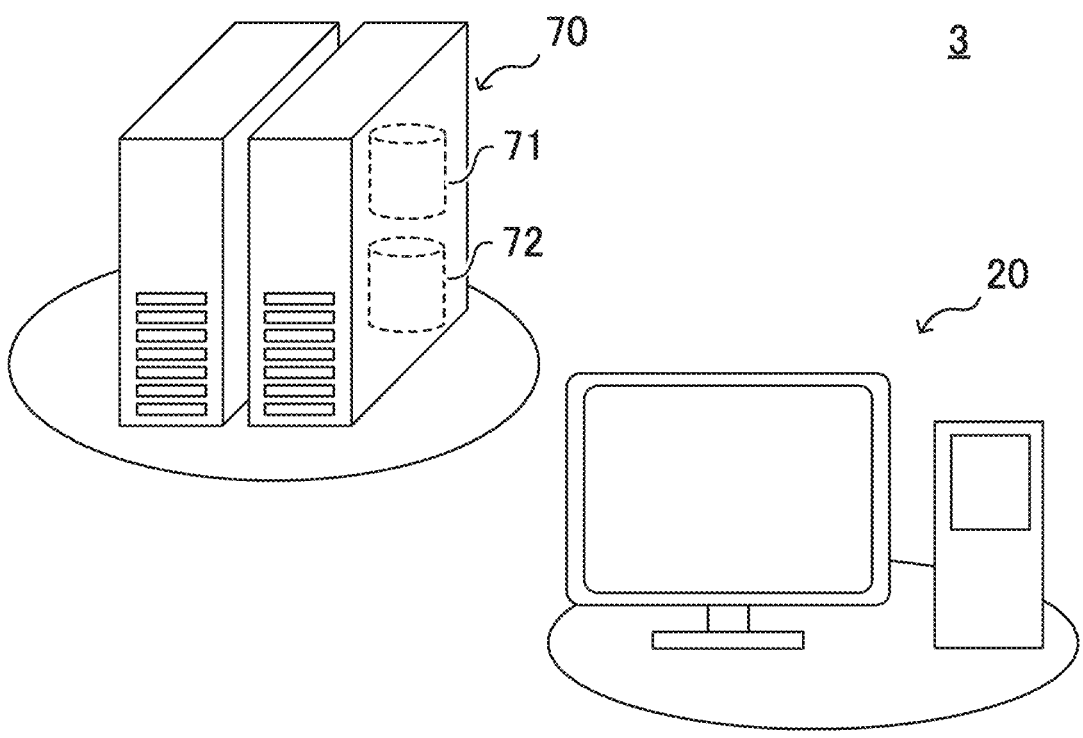
FIG. 11 is a diagram illustrating a configuration of a system according to a third embodiment.
FIG. 12 is a diagram illustrating a configuration of a system according to a fourth embodiment.

FIG. 11 is a diagram illustrating a configuration of a system according to the present embodiment. A system 2 according to the present embodiment includes a camera 10, an information processing apparatus 20, and an information processing apparatus 70. The system 2 is different from the system 1 in that the untransferred image data recorded in the recording medium 11 of the camera 10 is transferred to a storage device 71 of the information processing apparatus 70 different from the information processing apparatus 20 instead of being transferred to the information processing apparatus 20 in which an image management application program operates.

As illustrated in FIG. 11, the transfer destination of the image data is not limited to the information processing apparatus in which the image management application program operates, and can be arbitrarily set. Furthermore, the storage device of the transfer destination may be appropriately changed according to the free capacity of the storage device 71 of the transfer destination.

Fourth Embodiment

FIG. 12 is a diagram illustrating a configuration of a system according to the present embodiment. A system 3 according to the present embodiment includes an information processing apparatus 20 and an information processing apparatus 70. The system 3 is different from the system 2 according to the third embodiment in that instead of transferring image data from the recording medium 11 of the camera 10 to the storage device 71 of the information processing apparatus 70, image data is transferred from the storage device 71 of the information processing apparatus 70 to a storage device 72.

As illustrated in FIG. 12, the transfer source of the image data is not limited to the recording medium of the imaging device such as the camera 10. The system 3 may be applied to, for example, transfer and automatic deletion of image data from a server that accumulates a large amount of image data to another server.

On the other hand, it is very useful to transfer image data from the recording medium 11 of the camera 10 and delete the image data after the lapse of the grace period. The capacity of the recording medium 11 of the camera 10 is often smaller than that of a storage device of a general information processing apparatus, and the free capacity is likely to be tight. By performing the automatic deletion processing, even in a case where the capacity of the recording medium 11 is small, it is possible to avoid a situation in which an inconvenience due to insufficient capacity occurs.

The above-described embodiments have been given as specific examples to facilitate understanding of the invention, and the present invention is not limited to the above-described embodiments, and should be understood as including various modifications and alternative embodiments of the above-described embodiments. For example, it will be understood that the above-described embodiments can be embodied by modifying components without departing from the spirit thereof. In addition, it will be understood that various embodiments can be implemented by appropriately combining a plurality of components disclosed in the above-described embodiments. Furthermore, a person skilled in the art may understand that various embodiments may be implemented by deleting some components from all the components shown in the embodiments or adding some components to the components shown in the embodiments. That is, the image management apparatus, the image management method, and the program described above can be variously modified and changed without departing from the scope of the claims.

For example, in the above-described embodiment, an example has been described in which the information processing apparatus 20 inquires of the camera 10 about the presence or absence of the target data, the information processing apparatus 20 recognizes the presence of the target data, and then a request for image transfer and image deletion is transmitted to the information processing apparatus 20. However, the request for the image transfer and image deletion from the information processing apparatus 20 to the camera 10 is not necessarily transmitted after the presence of the target data is recognized. For example, the camera 10 that has received the request for the image transfer and image deletion from the information processing apparatus 20 may check the presence or absence of the target data, execute the image transfer and the image deletion if there is the target data, and notify the information processing apparatus 20 of the result.

Furthermore, in the above-described embodiment, an example in which the user explicitly sets the grace period has been described. However, the grace period may be automatically set by the information processing apparatus 20 according to the free capacity, for example, in a case where the free capacity of the recording medium 11 is large, the grace period is set to be long, and in a case where the free capacity of the recording medium 11 is small, the grace period is set to be short. Furthermore, instead of completely leaving the setting of the grace period to one of the information processing apparatus 20 and the user, the user and the information processing apparatus 20 may cooperate to set the grace period. For example, by setting the free capacity (or the ratio thereof) to be secured by the user, the information processing apparatus 20 may estimate a grace period during which the free capacity set by the user is secured on the basis of past results or the like, and set the estimated grace period.

Although not particularly mentioned in the above-described embodiment, the determination as to whether or not the grace period has elapsed may be made based on 0:00 after the lapse of the designated number of days until the automatic deletion, and if there is deletion target data after 0:00, a deletion instruction may be issued. In addition, whether or not the grace period has elapsed may be determined by obtaining the number of elapsed days by dividing the elapsed time by 24 starting from the end of transfer, and determining whether or not the number of elapsed days exceeds the designated number of days. If there is deletion target data at an arbitrary timing, a deletion instruction may be issued. In the deletion instruction, for example, the information processing apparatus 20 may detect that the power of the camera 10 is turned on, and then may issue the deletion instruction to the camera 10.

What is claimed is:

1. An image management apparatus, comprising:
    a hardware processor configured to execute processes comprising:
        setting, based on an instruction input by a user, a grace period for image deletion to be performed in response to transfer of at least one image from a first storage area to a second storage area different from the first storage area, the at least one image comprising duplicate image data generated by duplicating image data of an original image stored in the first storage area, and the grace period being a predetermined amount of time measured from the transfer of the at least one image; and
        outputting a control instruction to delete, from the first storage area, the original image from which the at least one image was generated, in response to a lapse of the predetermined amount of time of the grace period as measured starting from the transfer of the at least one image.

2. The image management apparatus according to claim 1, wherein the setting sets the grace period selected based on an operation of the user from among a plurality of options including a period immediately after the transfer of the at least one image and a certain period after the transfer of the at least one image.

3. The image management apparatus according to claim 1, wherein the processes further comprise, in response to the grace period being updated by the setting of the grace period, applying the updated grace period to all original images from which duplicate images have been generated and which have not yet been deleted from the first storage area at a time of updating the grace period.

4. The image management apparatus according to claim 3, wherein the processes further comprise:
    acquiring an instruction to update the grace period; and
    in response to the grace period being updated in response to the instruction, deleting, from the first storage area, the original images from which duplicate images have been generated and which have not yet been deleted from the first storage area at the time of the updating the grace period, after a lapse of the updated grace period as measured starting from the transfer of the duplicate images.

5. The image management apparatus according to claim 1, wherein:
    the image management apparatus is communicably connected to an imaging device external to the image management apparatus and including the first storage area therein, and
    the processor transmits, to the imaging device, a request for deleting the original image from the first storage area.

6. The image management apparatus according to claim 1, wherein the processor outputs the control instruction to delete the original image with respect to which the grace period for image deletion has elapsed in response to a power source of an imaging device that is a transfer source of the at least one image being turned on.

7. The image management apparatus according to claim 1, further comprising:
    a connection section by which the image management apparatus is communicably connected to an imaging device provided separately from the image management apparatus, the imaging device having the first storage area provided therein; and
    the second storage area, the second storage area being provided in the image management apparatus.

8. The image management apparatus according to claim 1, wherein the setting comprises selecting, based on the instruction input by the user, the grace period from among a plurality of mutually different predetermined grace periods.

9. An image management method executed under control of a computer to execute processing comprising:
    setting, based on an instruction input by a user, a grace period for image deletion to be performed in response to transfer of at least one image from a first storage area to a second storage area different from the first storage area, the at least one image comprising duplicate image data generated by duplicating image data of an original image stored in the first storage area, and the grace period being a predetermined amount of time measured from the transfer of the at least one image; and
    outputting a control instruction to delete, from the first storage area, the original image from which the at least one image was generated, in response to a lapse of the predetermined amount of time of the grace period as measured starting from the transfer of the at least one image.

10. A non-transitory computer-readable storage medium storing a program executable by a computer to execute 5 processing comprising:

setting, based on an instruction input by a user, a grace period for image deletion to be performed in response to transfer of at least one image from a first storage area to a second storage area different from the first storage 10 area, the at least one image comprising duplicate image data generated by duplicating image data of an original image stored in the first storage area, and the grace period being a predetermined amount of time measured from the transfer of the at least one image; and 15 outputting a control instruction to delete, from the first storage area, the original image from which the at least one image was generated, in response to a lapse of the predetermined amount of time of the grace period as measured starting from the transfer of the at least one 20 image.

\* \* \* \* \*